US012703797B2

(12) United States Patent
Asokan et al.

(10) Patent No.: US 12,703,797 B2
(45) Date of Patent: Aug. 11, 2026

(54) MULTIFUNCTIONAL HYBRID PARTICLE FIBER BOARD FROM AGRO-RESIDUES AND PROCESS FOR PREPARATION THEREOF

(71) Applicant: COUNCIL OF SCIENTIFIC AND INDUSTRIAL RESEARCH (an Indian registered body incorporated under, New Delhi (IN)

(72) Inventors: Pappu Asokan, Habibganj Naka (IN); Manoj Kumar Gupta, Habibganj Naka (IN); Sanjai Kumar Singh Rathore, Bhopal Madhya Pradesh (IN); Avanish Kumar Srivastava, Bhopal Madhya Pradesh (IN)

(73) Assignee: COUNCIL OF SCIENTIFIC AND INDUSTRIAL RESEARCH (AN INDIAN REGISTERED BO, New Delhi (IN)

( * ) Notice: Subject to any disclaimer, the term of this patent is extended or adjusted under 35 U.S.C. 154(b) by 519 days.

(21) Appl. No.: 17/964,246

(22) Filed: Oct. 12, 2022

(65) Prior Publication Data

US 2023/0119259 A1 Apr. 20, 2023

(30) Foreign Application Priority Data

Oct. 11, 2021 (IN) ............................ 202111046229

(51) Int. Cl.
*C08L 97/02* (2006.01)

(52) U.S. Cl.
CPC ........... *C08L 97/02* (2013.01); *C08L 2205/16* (2013.01)

(58) Field of Classification Search
None
See application file for complete search history.

(56) References Cited

U.S. PATENT DOCUMENTS

| | | | |
|---|---|---|---|
| 4,246,310 | A | 1/1981 | Hunt et al. |
| 6,564,521 | B1 | 5/2003 | Brown et al. |
| 2015/0314564 | A1 | 11/2015 | Mancini et al. |
| 2017/0058096 | A1 | 3/2017 | Salah et al. |
| 2019/0276671 | A1 | 9/2019 | Zhao et al. |

FOREIGN PATENT DOCUMENTS

| | | | |
|---|---|---|---|
| CN | 1294094 | A | 5/2001 |
| CN | 110520464 | B | 11/2022 |
| IN | 195175 | B | 9/2008 |
| WO | WO1996005347 | A1 | 2/1996 |
| WO | WO2005115705 | A1 | 12/2005 |
| WO | WO-2017093865 | A1 * | 6/2017 |
| WO | WO 2019211862 | A1 | 11/2019 |
| WO | WO 2020121319 | A1 | 6/2020 |

OTHER PUBLICATIONS

Asokan et al., "Recent Advances on Fly ash Particulates and Biofiber Reinforced Lightweight Hybrid Sandwich Composites," Int. J. of. Engineering Research and Technology, Oct. 2013, 2(10):2914-2923.

Das et al., "Physical, Mechanical and Water Absorption Behaviour of Coir Fiber Reinforced Epoxy Composites Filled With Al2O3 Particulates," Materials Science and Engineering, 2016, 115:012012, 11 pages.

H.K, et al., "Experimental Investigation of the Tensile strength and Compressive strength of Fly Ash Core Sandwiched Composite Mate," IOSR Journal of Engineering, Jun. 2014, 4(6):1-10.

Muñoz et al., "Water Absorption Behaviour and its Effect on the Mechanical Properties of Flax Fibre Reinforced Bioepoxy Composites," International Journal of Polymer Science, 2015, 390275:1-11.

Pappadà et al., "Processing, mechanical properties, and interfacial bonding of a thermoplastic core-foam/composite-skin laminated / sandwich panel," Advances in Polymer Technology, 2010, 29:137-145.

Yu et al., "Hybrid Composites from Wheat Straw, Inorganic Filler, and Recycled Polypropylene: Morphology and Mechanical and Thermal Expansion Performance," International Journal of Polymer Science, 2016, 2520670:1-13.

* cited by examiner

*Primary Examiner* — Katarzyna I Kolb
(74) *Attorney, Agent, or Firm* — Fish & Richardson P.C.

(57) ABSTRACT

The present invention relates to a multifunctional hybrid particle board and a process for manufacturing hybrid unlaminated and laminated green composite particle boards/fibre board and panels with variable density, mechanical strength, thermal conductivity and water absorption with epoxy and polyester resin system under compression moulding machine. Preparation process describe a process to effectively utilise agro-residues/particulates/fibres to avoid its burning and resultant air and environmental pollution. The applications of the fabricated unlaminated and laminated hybrid particle board for use in architectural cladding panels, partition panels, wall panels.

7 Claims, 2 Drawing Sheets

MULTIFUNCTIONAL HYBRID PARTICLE FIBER BOARD FROM AGRO-RESIDUES AND PROCESS FOR PREPARATION THEREOF

FIELD OF THE INVENTION

The present invention provides multifunctional Hybrid Particle Fibres Board and a process for preparation thereof. Particularly the present invention provides a manufacturing hybrid unlaminated composite particle boards/fibre board and panels with variable density, mechanical, thermal properties, and water absorption capacity. More particularly, the present invention provides a process for preparation of hybrid unlaminated and laminated particle board comprising class (i) of unglazed composite board with a skin or sheet made of processed industrial waste inorganic particulates and or natural fibers-based particle or in combination of both in polyester/epoxy resin system as a glossy finish moisture resistant outer skin layer under pressure of 90-160 $kg/cm^2$ and temperature of 35° C.-70° C. under compression moulding. Further the fabricated hybrid laminated particle boards are useful for door, partition wall panels and architectural interiors etc.

BACKGROUND OF THE INVENTION

Agriculture residues such as straw/stubble is an abundant and inexpensive lignocellulosic resource for manufacturing composites. Burning of agricultural residues such as paddy/wheat straw and other agro residues are one of the major sources for this higher level of air and smog pollution contributes for global warming and other environmental problems.

After China, India is the world's largest producer of paddy. In India, paddy crop has been cultivated in an area of about 43.95 million hectares producing about 106.54 million tonnes of edible yield rice and approximately 160 million tonnes of straw as residues. However, a large portion of the harvested agro residues, paddy straw/stubble/Parali (~140 MT), is burnt in field primarily to clear the farming land for farming activities for cultivation of next crop. In India, it is well known as Parali burning.

India produces about 98 million tonnes of paddy with around 130 million tonnes of paddy straw, which is essentially a renewable natural fibres available in surplus quantity. Presently, most of these surplus crop residues are burnt in the agricultural field to clear the land for cultivation of next crops. As a result various serious environmental issues created such as greenhouse gases emission, global warming effect and affecting human health. Further, burning agro-waste such as paddy straw, wheat straw, maze straw etc induces negative effect on farming land such as loss of plant nutrients like nitrogen, phosphorus, potassium and sulphur and soil air circulation and destroying and inhibiting soil microbial activities thus reduces the soil fertility. As claimed in the present invention, development of hybrid particle/fibre board using agro residues such as paddy straw and wheat straw has huge potential and opportunity to protect environment from pollution and create local sustainable employment, income followed by introducing new materials to the society for use in construction and building infrastructure.

Reference may be made to CN1294094A, wherein a process of making composite rice straw board is reported. The disclosure relates to preparation of composite sheet using rice straw with various inorganic materials and solvent such as magnesium, magnesium oxide, ferrous sulfate, oxalic acid and trisodium phosphate. The reported process involved various energy intensive steps such as pulverization, alkali treatment and bleaching. Moreover, the disclosure does not address the mechanical properties which is important to verify its usefulness to meet the materials performance for possible applications.

Glass or carbon fibre-reinforced thermoset polymer composite laminates or metal sheets with foam of polyurethane/polyethylene (see, e.g. S. Pappadh et al. *Processing, mechanical properties, and interfacial bonding of a thermoplastic core-foam composite-skin laminated sandwich panel*, Advances in Polymer Technology, (2010) 29 137-145))) are also developed as lightweight composites. However, production of glass fibres causes health hazards and it is not environment friendly and no paddy straw or stubble is used as main and active materials.

Reference may be made to US20170058096A1, wherein epoxy composites based on fly ash carbon nanotubes is reported. In this work fly ash is mixed with epoxy-carbon nanotube and then mixture is ultrasonicated, degassed, mixed with a curative, then placed into a mould to cure to form the composite. However, the composite film was flexible and are not suitable for building and construction application. Jute and kenaf fiber composite materials are reported in patent WO1996005347A1, where in thermoplastic polypropylene and polyethylene are used with jute and kenaf fibres. The process involved injection moulding method to prepare the composite. However, water absorption, surface finishing, mechanical properties are not disclosed, and natural fibres are used. In our present invention, we used paddy and wheat straw/stubble, particulates/fibres and we disclose a process to make high strength particle board materials with variable density and strength. Wood fibres/particulates or other agro fibres with polyurethane binder have been reported. But, use of paddy/wheat straw/stubble fibres in epoxy/polyester resin system is a new concept. This is the first generation materials and universally, no where such materials have been developed or reported for practical utility.

An improved process for the manufacture of natural fibre based composite laminates useful for making plain/corrugated sheets and products is discussed in the Indian patent (195175), where in chopped natural fibers are used in the isocyanate modified polyester polymer matrix. However, they reported composite sheet using natural fibres such as jute, sisal, coir etc. The reported work does not describe on use of paddy and wheat straw fibres/particulates to manufacture the new class of materials as described above in class (i) and (ii) or (iii) and (iv), which deals with variable strength, density and water absorption.

Very limited work have been reported universally on lightweight composites. The reported lightweight hybrid composites did not meet the required mechanical characteristics and consumer requirement and acceptability (US4246310A, WO2005115705A1). The work reported by Asokan et al. *Recent Advances on Fly ash Particulates and Biofiber Reinforced Lightweight Hybrid Sandwich Composites*, Int. J. of Engineering Research and Technology (2013) 2, 2914-2923 reveals use of fly ash with natural fibres in polyurethane system and it is not related to the present invention for use of paddy and wheat straw/stubble fibres in epoxy resin system. A reference may be made to patent WO2019/211862A1, where in inorganic waste particulates are used as core materials to prepare the hybrid composite in epoxy and polyester resin under compressive moulding. In another patent WO 2020/121319 A1 discloses the sandwich composite structure fabricated using inorganic particulates based hybrid composite under epoxy and polyester resin as skin materials and polyurethane foam and fibres based hybrid composite are used as core element under compression molding method. However, in the present invention we disclose a process to prepare the hybrid unlaminated and laminated particle/fibers Board from paddy and wheat straw/stubble under compression moulding as well under injection molding method.

In polymer based hybrid composites, normally material is damaged because of exposure of environment condition or mechanical pressure, the product strength sustains the composites temporarily and high water absorption of natural fibers based composite is major challenge. (see, e.g. E. Muñoz et al, *Water Absorption Behaviour and its Effect on the Mechanical Properties ofFlax Fibre Reinforced Bioepoxy Composites* International Journal of Polymer Science (2015) 390275; Geetanjali Das, et al. *Physical, Mechanical and Water Absorption Behaviour of Coir Fiber Reinforced Epoxy Composites Filled With $Al_2O_3$ Particulates*. Materials Science and Engineering 115 (2016) 012012. The present invention overcome all issues in these process of fabrication and applications.

Sandwich panels using polyurethane foam is disclosed in U.S. Pat. No. 6,564,521B1, wherein a metal, plywood, oriented strand board (OSB) or other lightweight material were used as core element. However, there was no report on the use of paddy and wheat straw fibres and achieving the desired results.

The hybrid filler including wheat straw (WS) and inorganic filler (calcium carbonate, silicon dioxide, and fly ash) in recycled polypropylene (R-PP) based composites showed water absorption in range of 5.0-16% (see, e.g. Min Yu et al. *Hybrid Composites from Wheat Straw, Inorganic Filler, and Recycled Polypropylene: Morphology and Mechanical and Thermal Expansion Performance*. International Journal of Polymer Science 2016, 2520670). The flexural strength of the developed materials was in range of 15-40 MPa. It is noted that the reported materials have fly ash and other inorganic materials as filler. The use of paddy straw fibre/particulates is not yet reported.

In an earlier work, polymer composite developed using fly ash and epoxy and woven glass fabric showed a density in range of 1.36-1.43 g/cc and tensile strength of 24 MPa, (See, e.g. Vijaykumar H. K, et al Experimental Investigation of the Tensile strength and Compressive strength of Fly Ash Core Sandwiched Composite Mate, IOSR Journal of Engineering, (2014), 4 1-10). However, no agro residue such as paddy straw were incorporated or used to fabricate such polymer composite sheet.

There were various constraints associated with composites developed/reported earlier by many researchers on: (i) the processing, uniform sizing, cleaning and removing wax and unwanted residues in paddy/wheat straw/stubble fibres and physico-mechanical homogeneous mixing paddy/wheat straw/stubble fibres with polymer in dry conditions, (ii) raw materials uniform size distribution moisture content and free from dust and dirt, (iii) weak interfacial bonding of agro residue with polymer matrix, (iv) reported composite structures also used additional inorganic filler as reinforcement element, (v) only natural fibres such as jute, sisal and coil fibres and chopped fibres are used, (vi) the reported composite sheet did not show good aesthetic properties/glossy finish appearance and mechanical strength, (vii) no lamination to protect and increase the strength of the materials in single stage fabrication process, (viii) composite materials were not derived from the waste resources, and (ix) different design systems were used.

OBJECTIVE OF THE INVENTION

The main objective of the present invention is to provide a multifunctional Hybrid Particle Fibres Board with variable density and a process for preparation thereof.

Another objective of present invention is to provide a process glossy finish hybrid unlaminated particle/fibres boards with wide spectrum as a better alternative to medium density fibre board, particle board.

Yet another objective of the present invention is to make hybrid glossy finish laminated particle/fibres boards using agro wastes such as processed paddy straw, wheat straw, stubble fibres along with inorganic waste particulates, fortified lamination in epoxy resin under compression moulding system.

Yet another objective of the present invention is to effectively utilize paddy straw/stubble and wheat straw to curb the air pollution cause by burning these agro residues for the development of environmentally friendly glossy finish high performance hybrid particle/fibres boards in various polymeric system.

Still, another objective of the present invention is to develop a water-resistant outer skin composites, using inorganic particulates reinforced with epoxy/polyester resin binder system.

Yet another objective of the present invention is to develop hybrid thermal insulating materials using paddy/wheat stubble fibres/particulates under compression moulding or injection moulding system.

Yet another objective of the present invention is to develop termite and fungus free and glossy finish decorative composites under compression moulding system as an architectural interiors for application in transport.

Still another objective of the present invention is develop the hybrid particle/fibres board and glossy finish laminated composites with density varying from 0.64 g/cc to 1.58 g/cc with its corresponding tensile strength, tensile modulus, flexural strength, flexural modulus and water absorption in the range of 20-40 MPa, 0.5-4.9 GPa, 20-50 MPa, 1.35-5.89 GPa and 0.02-62 %, respectively using waste particulates in epoxy and polyester fabricated through the compressive moulding machine.

SUMMARY OF THE INVENTION

In an aspect of the present disclosure there is provided a multifunctional hybrid particle fibres board from agro-residues fibre resources comprising paddy, wheat straw, stubble particulates, processed fibres with density in the range of 0.65-1.40 g/cc, tensile strength in the range of 20-38 MPa, tensile modulus in range of 0.5-4.55 GPa, flexural strength 30 to 48 MPa, impact strength in the range of 1220-2650 $J/m^2$, water absorbtion capacity in the range of 2-62.34%, thickness Swelling in the range of 3.94-22.13%, thermal Conductivity in the range 0.1247 W/mK to 0.4695 W/mK wherein the said board can be laminated or unlaminated having no volatile organic compounds (VOC) and formaldehyde emission.

In another aspect of the present disclosure, there is provided a process of production of Multifunctional hybrid particle fibres board from agro-residues wherein the said process comprises the steps of;

a. dry and wet processing of agro waste to obtain uniform length, removing moisture from agro waste particulates and fibres, b. homogeneous dry mixing of agrowastes obtained in step (a) wherein (5-80%) agrowastes particulates are mixed with mineral waste (80%), resin (8-10%) and catalyst (0.5-5%) along with pigment 0.2 to 0.5% resin using mechanical stirrer at 50-4000 rpm followed by compression moulding using compression moulding machine to prepare glossy finish hybrid particle board;

c. casting of glossy finish hybrid particle boards at temperature in the range of 25-75° C. at pressure in the range of 2-95 $kg/cm^2$ followed by curing the hybrid particle board at 50-120° C. for duration in the range of 2-24 hrs; and d. up scaling the glossy finish hybrid particle/fibres board to the dimension of 220 cm×120 cm with varying thickness of 6 mm, 9 mm, 12 mm, 19 mm, 25 mm, 30 mm and 50 mm were fabricated to obtain Multifunctional hybrid particle fibres board.

In yet another embodiment of the present invention, the agro residue are selected from the group consisting of paddy and wheat straw/stubble fibre, sisal fibre, jute fibre, banana fibre, flax, cotton, and hemp fibres wherein the processed fibres size in range of 5 μm-5 mm, density in range of 0.15-0.35 g/cc, porosity of 55-85%; and the jute fabric have density in the range of 1.7-2.4 g/cc, elongation in the range of 2-15%, tensile strength in the range of 250-800 MPa and Young's modulus in the range of 5-10 GPa.

In yet another of present invention, the mineral wastes are selected from the group consisting of marble, granite and stones waste, fly ash, red mud, lime sludge, gypsum rich wastes mineral, metallurgical, mining, chemical, fertiliser wastes, glass fibre reinforced plastic waste and silica fume, wherein the waste mineral particulates having particle size below 200 μm, density below 2.5 g/cc, porosity in the range of 30-68% and water holding capacity in the range of 2 to 110%.

In yet another of present invention, the polymer is selected from the group consisting of epoxy resin and polyester, polyurethane in the volume ratio ranging from 5-35%.

In yet another of present invention, wherein catalyst is selected from methyl ethyl ketone peroxide (MEKP), and aliphatic polyamine (Lapox K-6). In yet another of present invention, wherein the processed agrowaste particulates is mixed alone homogeneously with epoxy resin/polyester at a volume ratio ranging from 5-70%, and reinforced to prepare unlaminated hybrid particle and is calendared with 5-15% jute fabric to prepare the hybrid laminated hybrid particle boards.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "at least one" is used to mean one or more and thus includes individual components as well as mixtures/combinations.

Figure 1:
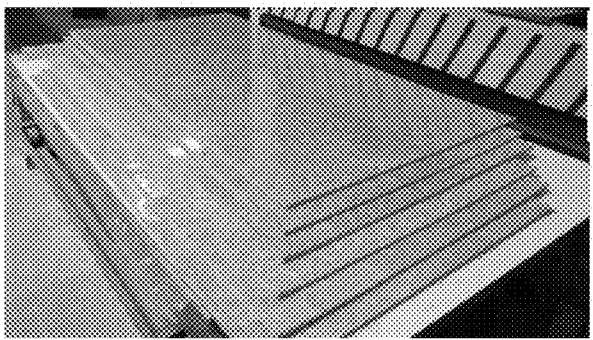
FIG. 1 illustrate the manufactured unlaminated hybrid particle board prepared from paddy straw fibres in epoxy resin system under compressive moulding machine, in accordance with an embodiment of the present disclosure.

Present invention deals with a simple process for manufacturing low density, medium density and high density particle/fibre board using processed paddy/wheat straw/stubble under compressive moulding machine, wherein paddy straw and 20%-80% wheat straw in epoxy/polyester binder system is used (FIG. 1). Paddy/wheat straw fibres based invented composites particle board exhibited a density ranging from 0.69-1.18 g/cc with its corresponding tensile strength, tensile modulus, flexural strength and flexural modulus in the range of 20-35 MPa, 0.50-3.8 GPa, 36-46 MPa and 1.4-4.20 GPa, respectively. The water absorption and thermal conductivity of the developed particle board were 2-32% and 0.3277 W/mK to 0.4243 W/mK.

In an embodiment of the present disclosure, there is provided a multifunctional hybrid particle fibres board from agro-residues fibre resources comprising paddy, wheat straw, stubble particulates, processed fibres with density in a range of 0.65-1.40 g/cc, tensile strength in a range of 20-38 MPa, tensile modulus in range of 0.5-4.55 GPa, flexural strength 30 to 48 MPa, impact strength in a range of 1220-2650 J/m$^2$, water absorption capacity in a range of 2-62.34%, thickness swelling in a range of 3.94-22.13%, thermal conductivity in a range of 0.1247 W/mK to 0.4695 W/mK, wherein said board can be laminated or unlaminated having no volatile organic compounds (VOC) and formaldehyde emission.

In an embodiment of the present disclosure, there is provided a process of production of Multifunctional hybrid particle fibres board from agro-residues, said process comprises the steps of:

a) dry and wet processing of an agrowaste to obtain uniform length, removing moisture from agrowaste particulates and fibres;
b) homogeneous dry mixing of agrowaste obtained in step (a) wherein (5-80%) agrowaste particulates are mixed with a mineral waste (80%), a resin (8-10%) and a catalyst (0.5-5%) along with a pigment resin (0.2 to 0.5%) using mechanical stirrer at 50-4000 rpm followed by compression moulding using compression moulding machine to prepare glossy finish hybrid particle board;
c) casting of glossy finish hybrid particle boards at a temperature in a range of 25-75° C. at a pressure in a range of 2-95 kg/cm$^2$ followed by curing the hybrid particle board at 50-120° C. for a duration in a range of 2-24 hrs; and
d) up scaling the glossy finish hybrid particle/fibres board to a dimension of 220 cm×120 cm with varying thickness in a range of 6 mm to 50 mm to obtain Multifunctional hybrid particle fibres board.

In an embodiment of the present disclosure, there is provided a process as disclosed herein, wherein up scaling the glossy finish hybrid particle/fibres board is carried out to obtain Multifunctional hybrid particle fibres board of dimension of 220 cm×120 cm with varying thickness of 6 mm, 9 mm, 12 mm, 19 mm, 25 mm, 30 mm and 50 mm.

In an embodiment of the present disclosure, there is provided a process of production of Multifunctional hybrid particle fibres board as disclosed herein, wherein the agrowaste is selected from a group consisting of paddy and wheat straw/stubble fibre, sisal fibre, jute fibre, banana fibre, flax, cotton, and hemp fibres, and the processed fibres of the agrowaste are in a size in a range of 5 μm-5 mm, density in a range of 0.15-0.35 g/cc, porosity of 55-85%; and the jute fabric has density in a range of 1.7-2.4 g/cc, elongation in a range of 2-15% tensile strength in a range of 250-800 MPa and Young's modulus in a range of 5-10 GPa.

In an embodiment of the present disclosure, there is provided a process of production of Multifunctional hybrid particle fibres board as disclosed herein, wherein the mineral wastes are selected from the group consisting of marble, granite and stones waste, fly ash, red mud, lime sludge, gypsum rich wastes mineral, metallurgical, mining, chemical, fertiliser wastes, glass fibre reinforced plastic waste and silica fume, and the mineral waste have particle size below 200 μm, density below 2.5 g/cc, porosity in a range of 30-68% and water holding capacity in a range of 2 to 110%.

In an embodiment of the present disclosure, there is provided a process of production of Multifunctional hybrid particle fibres board as disclosed herein, wherein the resin is selected from the group consisting of epoxy resin and polyester, and polyurethane in a volume ratio ranging from 5-35%.

In an embodiment of the present disclosure, there is provided a process of production of Multifunctional hybrid particle fibres board as disclosed herein, wherein the catalyst is selected from methyl ethyl ketone peroxide (MEKP), and aliphatic polyamine (Lapox K-6).

Figure 2:
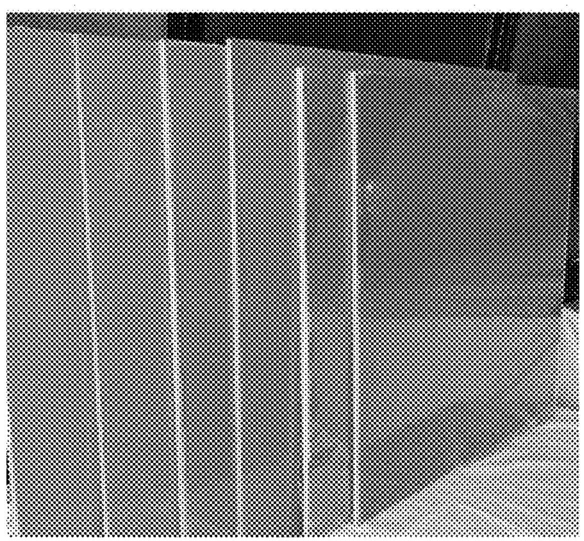
FIG. 2 illustrate the laminated particle board of paddy straw based polymer composite sheets as inner core and inorganic particulates based particle boards as skin materials fabricated under compressive moulding machine, in accordance with an embodiment of the present disclosure.
Figure 3:
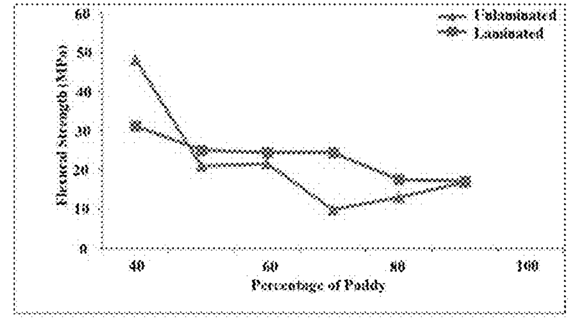
FIG. 3 illustrate the flexural strength curve with varying concentration of the paddy straw of unlaminated and laminated particle board, in accordance with an embodiment of the present disclosure.
Figure 4:
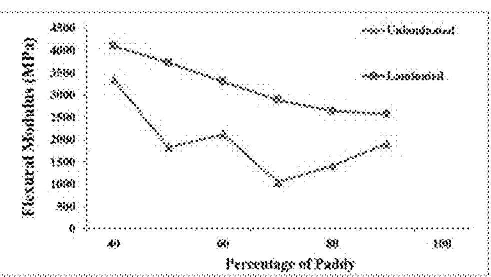
FIG. 4 illustrate the flexural modulus curve with varying concentration of the paddy straw of unlaminated and laminated particle board, in accordance with an embodiment of the present disclosure.
Figure 5:
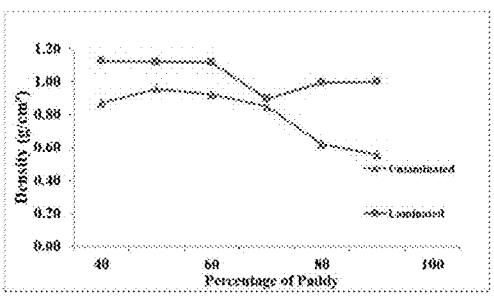
FIG. 5 illustrate is the density of the unlaminated and laminated board with varying concentration of the paddy straw, in accordance with an embodiment of the present disclosure.

In an embodiment of the present disclosure, there is provided a process of production of Multifunctional hybrid particle fibres board as disclosed herein, wherein the processed agrowaste particulates is mixed alone homogeneously with epoxy resin or a polyester at a volume ratio ranging from 5-70%, and reinforced to prepare unlaminated hybrid particle and is calendared with 5-15% jute fabric to prepare the hybrid laminated hybrid particle boards Present invention deals with a simple process for manufacturing high strength glossy finish unlaminated and laminated composites particle board under single stage as well as two stage operation mode, with the combination of 5-20% industrial waste particulates and 2-5% natural fibres/textiles such sisal fibres, jute fibres, banana fibres in epoxy/polyester binder system and paddy and wheat straw fibres reinforced with epoxy/polyester/binder as an inner materials, which has been made under compressive moulding machine (FIG. 1, 2), while FIG. 3 and FIG. 4 shows the flexural strength and flexural modulus curve of the unlaminated and laminated particle board with varying concentration of the paddy straw, and density of the laminated and unlaminated products is shown in FIGS. 1 and 2.

Figure 6:
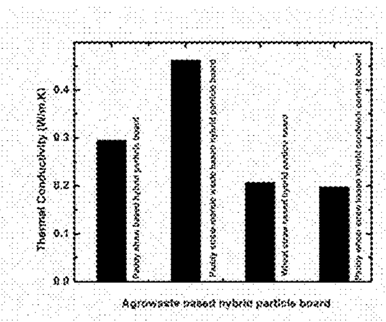
FIG. 6 illustrate the thermal conductivity of hybrid particle board from paddy, wheat straw and inorganic particulates, in accordance with an embodiment of the present disclosure.
Figure 7:
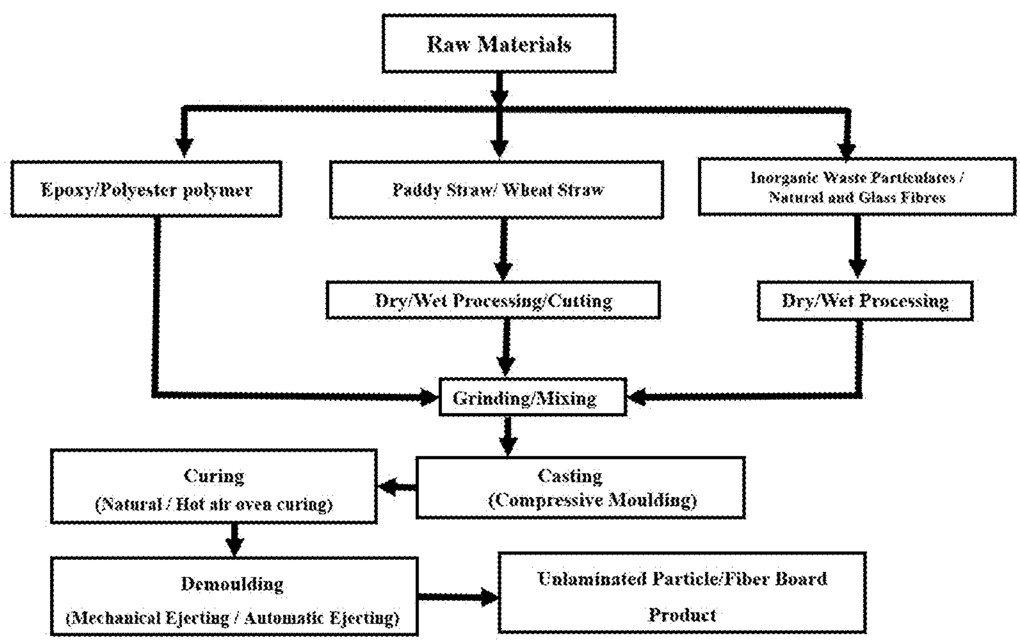
FIG. 7 illustrate the manufacturing process of the unlaminating particle/fibres board through compressive moulding technique, in accordance with an embodiment of the present disclosure.

Thermal conductivity of hybrid particle board prepared from the paddy, wheat straw and inorganic particulates are measured and shown in FIG. 6. The fabrication steps involved in the present inventions are shown in the FIG. 7.

The raw materials for fabrication of invented hybrid particle board composites are widely available in agro-industrial sector. The potential applications of particle/fibre board composites are building construction sector and transport system including locomotives (rail coach sleeper bed plank, interiors, seat back board, support panels, flooring, false ceiling and partition panels, toilet doors and panels) and for architectural interiors and furniture applications To fabricate the hybrid composite particle/fibre boards, agro-residue including paddy and wheat straw can be used. The physico-chemical properties and macromolecules analysis and CHNS analysis of paddy straw fibre/particulates of paddy straw are shown in the Table 1 and Table 2 respectively. The physico-chemical properties and macromolecules analysis and CHNS analysis of wheat straw fibre/particulates of paddy straw are shown in the Table 3 and Table 4 respectively. The bulk density, specific density, porosity, pH and electrical conductivity of the paddy and wheat straw were found in the range of the 0.16-0.23 g/cc, 1.02-1.10, 75-85%, 5.56-6.18 and 6.16-9.69 mS/cm. The density and mechanical properties of natural fibres such as jute, sisal, and glass and jute fabric are shown in Table 5.

TABLE 1

Physio-chemical properties of paddy straw/stubble

| S. No. | Bulk Density (g/cc) | Specific Gravity | Porosity (%) | pH | Electrical Conductivity (mS/cm) |
|---|---|---|---|---|---|
| 1. | 0.27 | 1.11 | 75.56 | 6.18 | 8.8 |
| 2. | 0.23 | 0.99 | 76.54 | 6.18 | 9.86 |
| 3. | 0.25 | 0.93 | 73.05 | 6.19 | 9.97 |
| 4. | 0.20 | 1.06 | 80.84 | 6.18 | 9.95 |
| 5. | 0.20 | 1.00 | 80.07 | 6.19 | 9.89 |
| Mean | 0.23 | 1.02 | 77.21 | 6.18 | 9.69 |
| SD | 0.030 | 0.068 | 3.233 | 0.003 | 0.501 |

TABLE 2

Macromolecules analysis and CHNS analysis of paddy straw/stubble

| S. No. | Cellulose (%) | Hemicellulose (%) | Lignin (%) | Carbon (%) | Hydrogen (%) | Nitrogen (%) | Sulphur (%) |
|---|---|---|---|---|---|---|---|
| 1. | 58.33 | 32.8 | 6.81 | 37.49 | 4.408 | 0 | 0.021 |
| 2. | 60.16 | 32.12 | 6.58 | 39.57 | 4.964 | 0 | 0.026 |
| 3. | 60.17 | 33.45 | 6.86 | 37.81 | 4.51 | 0 | 0 |
| 4. | 60.11 | 32.21 | 6.57 | — | — | — | — |
| 5. | 58.43 | 32.92 | 6.66 | — | — | — | — |
| Mean | 59.44 | 32.50 | 6.70 | 38.29 | 4.62 | 0 | 0.016 |
| SD | 0.970 | 0.351 | 0.132 | 1.120 | 0.296 | 0 | 0.014 |

TABLE 3

Physio-chemical properties of wheat straw/stubble.

| S. No. | Bulk Density (g/cc) | Specific Gravity | Porosity (%) | pH | Electrical Conductivity (mS/cm) |
|---|---|---|---|---|---|
| 1. | 0.16 | 1.10 | 85.29 | 5.55 | 5.93 |
| 2. | 0.16 | 1.09 | 84.88 | 5.55 | 6.20 |
| 3. | 0.15 | 1.10 | 85.68 | 5.56 | 6.21 |
| 4. | 0.16 | 1.17 | 85.92 | 5.56 | 6.20 |
| 5. | 0.16 | 1.02 | 83.75 | 5.56 | 6.26 |
| Mean | 0.16 | 1.10 | 85.10 | 5.56 | 6.16 |
| SD | 0.003 | 0.055 | 0.853 | 0.003 | 0.130 |

TABLE 4

Macromolecules analysis & CHNS analysis of wheat straw fibre

| S. No. | Cellulose (%) | Carbon (%) | Hydrogen (%) | Nitrogen (%) | Sulphur (%) |
|---|---|---|---|---|---|
| 1. | 38.60 | 41.97 | 6.03 | 2.00 | 0.18 |
| 2. | 37.80 | 42.10 | 5.91 | 2.89 | 0.13 |
| 3. | 42.40 | 42.08 | 6.06 | 2.35 | 0.16 |
| 4. | 41.30 | 42.11 | 6.07 | 2.60 | 0.18 |
| 5. | 38.70 | 41.99 | 6.04 | 2.67 | 0.16 |
| Mean | 39.76 | 42.05 | 6.02 | 2.50 | 0.16 |

TABLE 5

Mechanical properties of jute, sisal, and glass and jute fabric

| S.N | Parameters | Jute | Sisal | Glass | Jute Fabric |
|---|---|---|---|---|---|
| 1 | Density g/cc | 1.25-1.45 | 1.3-1.45 | 2.56 | 2.51 |
| 2 | Elongation (%) | 1.5-5.0 | 0.3-.75 | 4.5 | 19.27 ± 2.81 |
| 3 | Young's modulus (GPa) | 5-35 | 5.5-22.5 | 73.0 | 0.2 ± 0.01 |
| 4 | Tensile strength (MPa) | 300-650 | 250-650 | 2000 | 18.07 ± 1.30 |

The findings of the present invention showed the acceptable and improved performance of materials in terms of the density, water absorption, mechanical strength such as flexural and tensile properties and thermal conductivity oflow and medium density unlaminated particle board/fibre board as compared to the work reported by others as well as existing materials available in the market (US 2015314564A1, Laminated Magnesium Cement Wood Fiber Construction Materials). The developed product has multifunctional potential application of lightweight and stiff components for architectural interior in building and transport system. The utility of the concept developed in the present invention opened an avenue to curb the air pollution emission due to burning of crop residue and also potentially exploit the unutilised waste particulates and fibres in replacing glass fibres and other petroleum based fibres for making hybrid composites and laminated structures.

The glossy finish laminated composites has remarkable scope in wide range of applications such as false ceiling, water proof partition, acoustic construction panels, load bearing and non load bearing walls as a architectural panels/partitions in housing sector, construction industries, locomotive and automotive sectors. Furthermore, composites made polymer are moisture resistant, free from insects, fungus, termite, and corrosion attack. The laminated/laminated composite structure exhibits improved mechanical strength and an effective way to utilise agro waste as high end product as new class of prelaminated composites for multifunctional applications. The present invention has significant role for commercial exploitation of unutilised agro waste resources as reinforcing fibre for manufacturing renewable fibre reinforced composites and composite timber products for sustainable development and also to avoid burning of the agro waste in the farmer land contributing to reduce global warming challenges.

In an embodiment of the present invention, the surface finish high performance hybrid green unlaminated composite particle/fibres board with low water absorption, variable density and mechanical strength are fabricated using agro-waste such as paddy, wheat straw/stubble with epoxy, polyester, polyurthene resin, under compressive moulding machine.

Large scale size of desired thickness and dimension under compressive moulding machine and desired shape of agro waste (paddy and wheat straw) particle board composite panels through compressive moulding system can be possible. The potential applications of composites are architectural interiors in building construction sector, wood substitute and transport system including locomotives (rail coach sleeper bed plank, interiors, seat back board, support panels, flooring, false ceiling and partition panels, toilet doors and panels).

In another embodiment of the present invention deals with the development of high performance surface finish laminated composite decorative green laminated particle board composites using industrial waste particulates (particulates arising from any type of waste stream) together with or without short/textile fibres (glass/carbon/sisal/jute/armid/banana/hemp/flax/cotton fibres or any other fibres) reinforced with epoxy binder system as skin element (face sheet) and agrowaste prepared using paddy and, wheat straw/stubble with epoxy, polyester, polymers as core materials for structural applications. These composites skin element can be made either with particulates or with particulates and fibres or only using fibre/textile with epoxy resin system under compression moulding either in open mould or closed mould system. The potential applications of composites are architectural interiors in building construction sector and infrastructure.

TABLE 6

Details of /biological resources used.

| S1. No | Accessed (Biological Resources) | Nature of biological resources | Common name Scientific name | Part of biological resources | Details of source of biological resource With complete address |
|---|---|---|---|---|---|
| 1. | Rice straw | Plant | Paddy Oryza sativa L. | Stem/ straw | 1. Mr.Nikelesh Patidar Deepdi Tehsil- Huzur ; Block- Phanda ; Bhojpur Road Bhopal, (MP ) 462030 2.Dr.Ashavani Kumar, Sunheri ; Khalsa, Thanser Taluk, Kurukshetra, Haryana PIN: 136038 |
| 2. | Wheat straw | Plant | Wheat Triticum aestivum | Stem/ straw | Mr.Rohit Patidar Mungaliya Chhap; Tehsil - Huzur ; Block- Phanda Neelbad Road; District : Bhopal Madhya Pradesh PIN: 462044 |
| 3. | Jute fibre | Plant | Jute Corchorus olitorius | Stem / straw/ leaf | Mr.Navin Kumar Jain Kharida main Road Kharagpur, Kharagpur, West Bengal PIN: 721301 |
| 4. | Sisal fibre | Plant | Sisal Agave sisalana | Stem / straw/ leaf | Dr, Asokan pappu CSIR-AMPRI, Hoshangabad Road Bhopal; Saket Nagar Bhopal, ( MP) PIN: 462023 |
| 5. | Banana fibre | Plant | Banana Musa textilis | Stem/ straw/leaf | Mr. TVR. Antony Sethumadai, Pollachi Coimbatore (TN) PIN: 642133 |
| 6. | Flax fibre | Plant | Flax Linum usitatissimum | Stem/ straw/leaf | Mr.Qadir Abdul Anwar GovindPura Bhopal 462023, (MP) PIN: 462023 |
| 7. | Fibre | Plant | Cotton Gossypium hirsutum | Stem/ straw/leaf | Mrs. Saroja Mariappan ThethakudiVeda raniamNagapattinam Tamil Nadu PIN: 614809 |
| 8. | Coir | Plant | Coconut Cocos nucifera | Stem/ straw/leaf | Mrs. SarojaMariappanThet hakudiVedaraniamNagapat tinam Tamil Nadu PIN: 614809 |
| 9. | Hemp fibre | Plant | Hemp Cannabis sativa | Stem/ straw/leaf | Mr.Santosh Batham 80 Feet Road 63-Krishna Campus city Bhopal, 462010 (M.P) PIN: 462010 |
| 10. | Wood | Plant | Elm Ulmus procera | Stem | Mr.Santosh Batham 80 Feet Road 63-Krishna Campus city Bhopal, (M.P) PIN: 462010 |
| 11. | Packaging wood | Plant | Champ (Packaging wood) Miehelia spp | Stem | Mr.Santosh Batham 80 Feet Road 63-Krishna Campus city Bhopal, (M.P) PIN: 462010 |
| 12. | Packaging wood | Plant | Vellapine (Packaging | Stem | Mr. Santosh Batham 80 Feet Road 63-Krishna |

TABLE 6-continued

| Details of /biological resources used. | | | | | |
|---|---|---|---|---|---|
| S1. No | Accessed (Biological Resources) | Nature of biological resources | Common name Scientific name | Part of biological resources | Details of source of biological resource With complete address |
| | | | wood) Vateria indica | | Campus city Bhopal, (M.P) PIN: 462010 |
| 13. | Bagasse | Plant | Sugar Cane/Bagasse Saccharum | Stem | Mr.Santosh Batham 80 Feet Road 63-Krishna Campus city Bhopal, (M.P) PIN: 462010 |
| 14. | Unlaminated Particle boad | Plant | Unlaminated particle board Officinarum | Stem | Mr. Santosh Batham 80 Feet Road 63-Krishna Campus city Bhopal, (M.P) PIN: 462010 |
| 15. | Teak wood | Plant | Teak Tectona grandis | Stem | Mr.Santosh Batham 80 Feet Road 63-Krishna Campus city Bhopal, (M.P) PIN: 462010 |
| 16. | Unlaminated Particle boad | Plant | unlaminated plywood Officinarum | Stem | Mr. Santosh Batham 80 Feet Road 63-Krishna Campus city Bhopal, (M.P) PIN: 462010 |

The present invention discloses a process for fabrication of variable density hybrid green particle/fibres board using agrowaste such as paddy and wheat straw/stubble with epoxy and polyester system by compressive route. The significant feature of the present invention is associated with development of agro waste hybrid composites with waste inorganic particulates such as marble, granite and stone waste, fly ash, lime, gypsum rich wastes mineral, metallurgical, mining, chemical, fertiliser wastes. Laminated/composite sheet was developed using polymeric-agro waste based materials/panels based on agrowaste as core element and skin element prepared using inorganic waste particulates and fibres with epoxy/polyester/. These high performance agrowaste composites and laminated structures are useful for multiple applications spectrums as alternative materials to timber, plastic and FRP/GRP products/materials. The Properties of the various particle board developed using agrowaste is defined in table 7.

EXAMPLES

The disclosure will now be illustrated with the working examples, which is intended to illustrate the working of disclosure and not intended to take restrictively to imply any limitations on the scope of the present disclosure. Unless defined otherwise, all technical and scientific terms used herein have the same meaning as commonly understood to one ordinary person skilled in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

The following examples are given by way of illustration and therefore should not be construed to limit the scope of the present invention.

Example 1

Paddy and wheat straw/stubble were used as main materials. Polymer used to make glossy finish particle board was commercial grade epoxy resin. Aliphatic polyamine (Lapox K-6) of 10% was used as hardener and curing agent in case of epoxy resin. Paddy and wheat straw used in these glossy finish hybrid green composites materials have particle size in range of 100 μm, density of 0.16-g/cc, porosity of 75-85% and water holding capacity in range of 25 to 110%.

Detailed laboratory experimental programme was conducted wherein, to fabricate the hybrid composite particle board, a wide range of agrowaste such as paddy stubble were processed and 70% of processed paddy straw were homogeneously mixed with the epoxy resin based binder system using mechanical stirrer at room temperature. Aliphatic polyamine (Lapox K-6) of 10% was used with epoxy resin. A compression moulding machine was used to fabricate the glossy finish paddy straw reinforced polymer composite. Casting and fabrication of the particle board was done at varying temperature of 40±2° C. and at varying casting pressure from 95 kg/cm$^2$ in single operation mode. The fabricated glossy finish hybrid green particle board were cured in an oven at 80° C. for 12 hours. Pigment of about 0.5% of epoxy resin was used to create colour in composite sheet. Up-scaling of agrowaste composites sheets up to the dimension of 220 cm×120 cm with varying thickness of 6 mm, 9 mm, 12 mm, 19 mm, 25 mm, 30 mm and 50 mm was done through the compressive moulding machine.

Properties: (Particle Board Based on Paddy Straw Reinforced with Epoxy Resin)

Density: 0.70
Water Absorption: 15%
Tensile Strength: 22 MPa
Tensile Modulus: 0.5 GPa
Flexural Strength: 20 MPa
Flexural Modulus: 2 GPa
Impact Strength: 1220-J/m$^2$
Thickness Swelling: 22.13%
Thermal Conductivity: 0.3277 W/mK

Example 2

Paddy and wheat straw/stubble were used as main materials. Polymer used to make glossy finish particle board was commercial grade polyester. Methyl ethyl ketone peroxide (MEKP) was used as a catalyst, and cobalt naphthenate was used as an accelerator. Paddy and wheat straw used in these glossy finish hybrid green composites materials have particle size of 100 μm, density of 0.16-g/cc, porosity of 75-85% and water holding capacity in range of 25 to 110%.

Detailed laboratory experimental programme was conducted wherein, to fabricate the hybrid composite particle board, a wide range of agrowaste such as paddy stubble were processed and 70% of processed paddy straw were homogeneously mixed with the polyester resin based binder system using mechanical stirrer at room temperature and methyl ethyl ketone peroxide (MEKP) was used as a catalyst, and cobalt naphthenate was used as an accelerator. A compression moulding machine was used to fabricate the glossy finish paddy straw reinforced polymer composite. Casting and fabrication of the particle board was done at varying temperature of 40±2° C. and at varying casting pressure from 95 $kg/cm^2$ in single operation mode. The fabricated glossy finish hybrid green particle board were cured in an oven at 80° C. for 12 hours. Pigment of about 0.5% of epoxy resin was used to create colour in composite sheet. Up-scaling of agrowaste composites sheets up to the dimension of 220 cm×120 cm with varying thickness of 6 mm, 9 mm, 12 mm, 19 mm, 25 mm, 30 mm and 50 mm was done through the compressive moulding machine.

Properties: (Particle Board Based on Paddy Straw Reinforced with Polyester Resin)

Density: 0.65
Water Absorption: 17%
Tensile Strength: 20 MPa
Tensile Modulus: 0.4 GPa
Flexural Strength: 18 MPa
Flexural Modulus: 2 GPa
Impact Strength: 1200-$J/m^2$
Thickness Swelling: 25%
Thermal Conductivity: 0.33 W/mK Example 3

Raw Materials: Paddy and wheat, straw/stubble were used as main materials. Natural and synthetic fibres such as glass, sisal, pine apple fibre, jute fibre, banana fibre, flax, cotton, hemp fibres were used as reinforced materials. Commercial grade bi-directional jute fabric [grams per square metre (GSM) of about 300 GSM] and chopped fabric with size of 2.0-45 mm were used. The polymer used to make glossy finish particle board was commercial grade epoxy/polyester resin. Aliphatic polyamine (Lapox K-6) of 10% was used as hardener and curing agent in case of epoxy resin Paddy and wheat straw used in these glossy finish hybrid green composites materials having particle size in range of 1 cm, density of 0.16 g/cc, porosity of 85% and water holding capacity in range of 80%. Fibers used to fabricate glossy finish skin materials have density in range of 1.25-1.45 g/cc, elongation of 5.0%, tensile strength of 250—MPa and Young's modulus in range of 5-GPa.

Detailed laboratory experimental programme was conducted to fabricate the paddy/straw and fibres reinforced hybrid particle/fibres board wherein a wide range of fibres (e.g. glass fibre, sisal fibre, pine apple fibre, jute fibre, banana fibre, flax, cotton, hemp fibres) were chemically processed and 15 ratio of fibre or chopped fibres were used alone or hybridization with other fibers (one type or in combination of 2 or more types of chopped fibre in one sheets) were homogeneously mixed with the agrowaste such as paddy, 45%) in epoxy resin based binder system using mechanical stirrer at room temperature and aliphatic polyamine (Lapox K-6) of 10% was used as hardener and curing agent in case of epoxy resin. A compression moulding machine was used to fabricate the paddy straw and fibres reinforced particle boards composite. Casting and fabrication of the sheet was done at varying temperature of 40±2° C. and at varying casting pressure from 95 $kg/cm^2$ in single operation mode. The fabricated glossy finish skin sheets were cured in an oven at 80° C. for 12 hours. Pigment of about 0.5% of epoxy resin/polyester resin was used to create colour in composite sheet.

Up-scaling of fungus and termite resistant glossy finish hybrid particle/fibres board was also done and product up to the dimension of 220 cm×120 cm with varying thickness of 6 mm, 9 mm, 12 mm, 19 mm, 25 mm, 30 mm and 50 mm were fabricated.

Properties: (Particle Board Based on Paddy Straw Reinforced with Fibres in Epoxy Resin Matrix)

Density: 0.70
Water Absorption: 10%
Tensile Strength: 28 MPa
Tensile Modulus: 3 GPa
Flexural Strength: 20 MPa
Flexural Modulus: 3.5 GPa
Impact Strength: 2400 $J/m^2$
Thickness Swelling: 15%
Thermal Conductivity: 0.0.350 W/mK Example 4

Paddy and wheat straw/stubble were used as main materials. Polymer used to make glossy finish particle board was commercial grade epoxy/polyester. Methyl ethyl ketone peroxide (MEKP) and cobalt naphthenate were used as catalyst for polyester resin and aliphatic polyamine (Lapox K-6) of 10% was used as hardener and curing agent in case of epoxy resin. Paddy and wheat straw used in these glossy finish hybrid green composites materials have particle size in range of 100 μm, density of 0.16-g/cc, porosity of 75-% and water holding capacity of 50%. Inorganic waste particulates such as marble waste and fly ash are also used.

Detailed laboratory experimental programme was conducted wherein, to fabricate the hybrid composite particle board, a wide range of agrowaste such as paddy stubble were processed and 60% of processed paddy straw were homogeneously mixed with the epoxy resin based binder (25%) system using mechanical stirrer at room temperature. Aliphatic polyamine (Lapox K-6) of 10% was used with epoxy resin. A compression moulding machine was used to fabricate the glossy finish paddy straw reinforced polymer composite Inorganic waste particulates such as marble waste and fly ash are also used in 15% with agro waste. Casting and fabrication of the particle board was done at varying temperature of 40±2° C. and at varying casting pressure from 95 $kg/cm^2$ in single operation mode. The fabricated glossy finish hybrid green particle board were cured in an oven at 80° C. for 12 hours. Pigment of about 0.5% of epoxy resin is used to create colour in composite sheet. Up-scaling of agrowaste composites sheets up to the dimension of 220 cm×120 cm with varying thickness of 6 mm, 9 mm, 12 mm, 19 mm, 25 mm, 30 mm and 50 mm was done through the compressive moulding machine.

Properties: (Paddy Straw Reinforced with Inorganic Waste Particulates in Epoxy Resin Particle Board)

Density: 1.15 g/cc
Water Absorption: 2%
Tensile Strength: 25 MPa
Tensile Modulus: 4.5 GPa
Flexural Strength: 40 MPa Flexural Modulus: 2.5 GPa
Impact Strength: 2200-J/$m^2$
Thickness Swelling: 7%
Thermal Conductivity: 0.352 W/mK Example 5

Raw Materials: Paddy and wheat, straw/stubble were used as main materials. Natural and synthetic fibres such as glass, sisal, pine apple fibre, jute fibre, banana fibre, flax, cotton, hemp fibres were used as reinforced materials. Commercial grade bi-directional jute fabric [grams per square metre (GSM) of about 300 GSM] and chopped fabric with size of 2.0-45 mm were used. The polymer used to make glossy finish particle board was commercial grade epoxy resin. Aliphatic polyamine (Lapox K-6) of 10% was used as hardener and curing agent in case of epoxy resin. Paddy and wheat straw used in these glossy finish hybrid green composites materials have particle size in range of 1 cm, density of 0.16 g/cc, porosity of 85% and water holding capacity in range of 80%. Fibers used to fabricate glossy finish skin materials have density in range of 1.25-1.45 g/cc, elongation of 5.0%, tensile strength of 250-MPa and Young's modulus in range of 5-GPa. Marble waste and fly ash waste particulates are used as filler.

Detailed laboratory experimental programme was conducted to fabricate the paddy/straw and fibres reinforced hybrid particle/fibres board wherein a wide range of fibres (e.g. glass fibre, sisal fibre, pine apple fibre, jute fibre, banana fibre, flax, cotton, hemp fibres) were chemically processed and ratio of fibre or chopped fibres were used alone or hybridization with other fibers (one type or in combination of 2 or more types of chopped fibre in one sheets) were homogeneously mixed with the agrowaste such as paddy, 45%) in epoxy resin based binder system using mechanical stirrer at room temperature and aliphatic polyamine (Lapox K-6) of 10% was used as hardener and curing agent in case of epoxy resin. Marble waste and fly ash waste particulates are used as filler of amount 10%. A compression moulding machine was used to fabricate the paddy straw and fibres reinforced particle boards composite. Casting and fabrication of the sheet was done at varying temperature of 40±2° C. and at varying casting pressure from 95 kg/$cm^2$ in single operation mode. The fabricated glossy finish skin sheets were cured in an oven at 80° C. for 12 hours. Pigment of about 0.5% of epoxy resin/polyester resin is used to create colour in composite sheet.

Up-scaling of fungus and termite resistant glossy finish hybrid particle/fibres board was also done and product up to the dimension of 220 cm×120 cm with varying thickness of 6 mm, 9 mm, 12 mm, 19 mm, 25 mm, 30 mm and 50 mm were fabricated.

Properties: (Particle Board Based on Paddy Straw Reinforced with Inorganic Particulates and Fibres in Epoxy Resin)
Density: 0.95
Water Absorption: 12%
Tensile Strength: 30 MPa
Tensile Modulus: 3.2 GPa
Flexural Strength: 35 MPa
Flexural Modulus: 3.5 GPa
Impact Strength: 2600 J/$m^2$
Thickness Swelling: 12%
Thermal Conductivity: 0.352 W/mK Example 6

Paddy and Wheat Straw/Stubble were Used as Main Materials to Fabricate the Laminated Particle Board Industrial waste particulates (mineral wastes, mining wastes, polymeric wastes, marble, stones, granite waste, polymeric waste ground residues, fly ash, chemical industry gypsum based waste, residues arising from secondary process of zinc, copper, aluminum, smelters, agricultural green residues, burned residues) were used as reinforced materials. Polymer used to make glossy finish laminated particle boards was commercial grade epoxy/polyester. Aliphatic polyamine (Lapox K-6) of 8-10% was used as hardener and curing agent in case of epoxy resin. Industrial waste particulates used in these glossy finish green laminated particle boards have particle size in range of 50 μm, density of 1.87 g/cc, porosity of 50% and water holding capacity in range of 40%. Paddy straw used in these glossy finish hybrid green composites materials have particle size in range of 100 μm.

Detailed laboratory experimental programme was conducted wherein, to fabricate the skin/face materials sheet, a wide range of industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were processed and 70% of wastes were used alone or hybridization with other industrial wastes (one or in combination of two or more than two types of waste particulates) and they were homogeneously mixed with the epoxy/polyester resin based binder system using mechanical stirrer at room temperature. Aliphatic polyamine (Lapox K-6) of 10% was used as hardener and curing agent in case of epoxy resin. Hybrid particle boards reinforced with and without fibres (e.g. glass fibre, sisal fibre, pine apple fibre, jute fibre, banana fibre, flax, cotton, hemp fibres) and inorganic waste particulates sheet are used as face sheet. Laminated particle boards are prepared under compressive moulding machine are used as core element. A compression moulding machine was used to fabricate the glossy finish skin materials in particle boards. Casting and fabrication of the skin sheet was done at varying temperature of 40±2° C. and at varying casting pressure from 95 kg/$cm^2$ in single operation mode. The fabricated glossy finish skin sheets were cured in an oven at 80° C. for 12 hours. Pigment of about 0.5% of epoxy resin is used to create colour in skin composite sheet. Particulate reinforce polymer composites decorative sheets as fabricated used as outer cover/skin element to fabricate the laminated composite. Laminated composites were fabricated using polymeric pre-fabricated agrowaste composites (such as paddy and wheat, reinforced in epoxy/system) by compression moulding system with a pressure as high as 180 kg/$cm^2$ at temperature 38±2° C. to heating condition (60±2° C.). The invented laminated product was scale up and agrowaste composite up to dimension of 220 cm×120 cm were also fabricated.

Properties: (Laminated Board Based Paddy Straw/Fibres/Inorganic Waster Reinforced with Epoxy Resin as Skin and Inorganic Waste Particulates Based Board as Skin Materials)
Density: 1.3 g/cc
Water Absorption: 2.0% 6%
Tensile Strength: 3800 MPa
Tensile Modulus: 4.55 GPa
Flexural Strength: 42 MPa
Flexural Modulus: 89 GPa 4.89 GPa
Thickness Swelling % 4%
Thermal Conductivity: 0.42.

For all above composites as described in examples (1-5), physical and mechanical properties of agrowaste (Paddy and wheat straw) based hybrid particle boards as well as hybrid laminated composites were tested according to ASTM D 638 standard using ultimate tensile testing machine (UTM), LRX Plus, Lloyd, UK. Tensile modulus and strain rate were tested and recorded from the stress-strain data. Flexural test were performed according to ASTM D790. Thermal conductivity was done using Quick Thermal Conductivity Meter, QTM-710/QTM-700.

TABLE 7

Properties of the various particle board developed using agrowaste:

| Properties | Particle Board Based on Paddy/Wheat Straw unde rEpoxy/ Polyester Matrix | Particle Board Based on Paddy/Wheat Straw reinforced with Fibres unde rEpoxy/ Polyester Matrix | Particle Board Based on Paddy/Wheat Straw reinforced with Fibres and Inorganic Waste Particulates under Epoxy/ Polyester Matrix | Laminated Particle Board Based on Paddy/Wheat Straw reinforced with Fibres/ Inorganic Waste Particulates under Epoxy/Polyester Matrix as core and Inorganic Waste Particulates based sheet as skin |
|---|---|---|---|---|
| Density | 0.69-1.18 g/cc | 0.65-1.17 g/cc | 0.70-1.15 g/cc | 0.98-1.40 g/cc |
| Water Absorption | 15-62.34% | 10-52.00% | 12-35.00% | 6.00-10.45% |
| Tensile Strength | 20.00-35 MPa | 26.0-30.00 MPa | 28.0-35.00 MPa | 30.00-38.00 MPa |
| Tensile Modulus | 0.50-3.80 GPa | 0.88-4.00 GPa | 1.0-4.55 GPa | 0.78-4.55 GPa |
| Flexural Strength | 30.00-45.00 MPa | 32-47 MPa | 35-48 MPa | 38-48.50 MPa |
| Flexural Modulus | 1.4-4.20 MPa | 2.3-5.5 GPa | 2.5-5.0 GPa | 3.50-4.89 GPa |
| Impact Strength | 1220-2450 J/m$^2$ | 1250-2550 J/m$^2$ | 1250-2600 J/m$^2$ | 1700-2650 J/m$^2$ |
| Thickness Swelling | 6.69-22.100% | 5.0-15.00% | 2-14% | 2-12% |
| Thermal Conductivity | 0.1277 W/mK to 0.4243 W/mK | 0.228 W/mK to 0.46 W/mK. | 0.328 W/mK to 0.48 W/mK. | 0.1247 W/mK to 0.48 W/mK |

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

Advantages of the Invention

The various advantages of the present process are given below. The present disclosure provides a surface and glossy finish new class of green hybrid particle boards from paddy and wheat straw fibres. The present disclosure further provides a process for the development of agrowaste polymer composite along with inorganic waste particulates of required and variable specific density for a specific application and for the development of termite resistant agro residue/stubble based hybrid green composite. The process of the present disclosure is a simple process to make thermal insulating sheet using agro-residue such as paddy and wheat straw.

Additionally the present disclosure discloses development of high performance agrowaste composite sheet with variable tensile strength, tensile modulus and flexural strength for versatile applications. The present disclosure provides utilisation of agrowaste and industrial waste particulates as an additive, catalyst, binder, filler and smooth surface finish and decorative agent in making lightweight composites and utilisation of agrowastes as a major core raw materials along with industrial wastes/mineral wastes for making new class of highly durable laminated hybrid composites particle boards as an furniture materials, architectural cladding materials for interiors and exterior applications in civil infrastructure.

The product of the present disclosure further includes anew class of glossy surface finish unlaminated particle board for false ceiling and architectural interiors and green composites materials free from insects, fungus, and termite. The process is an unique approach for making a unique laminated particle boards for multifunctional application and is a sustainable approach for the development of green composite particle board from agro residues leading generate employment and income and livelihood improvement of rural people. The present disclosure also provides a sustainable approach to stop burning agro residues and avoid smog, suspended particulates and air pollution contributing to reduce global warming and is an unique and holistic solution to stop Parali burning (Paddy straw/stubble) which in turn avoids environmental pollution largely.

We claim:

1. A multifunctional hybrid particle fiber board from agro-residues comprising paddy straw, wheat straw, and stubble particulates, and from jute fabric with a density in a range of 1.7-2.4 g/cc, wherein the multifunctional hybrid particle fiber board comprises processed fibers with a density in a range of 0.65-1.40 g/cc, a tensile strength in a range of 20-38 MPa, a tensile modulus in range of 0.5-4.55 GPa, a flexural strength 30 to 48 MPa, impact strength in a range of 1220-2650 J/m$^2$, a water absorption capacity in a range of 2-62.34%, a thickness swelling in a range of 3.94-22.13%, and a thermal conductivity in a range of 0.1247 W/mK to 0.4695 W/mK, and wherein said multifunctional hybrid particle fiber board has no emission of volatile organic compounds (VOC) or formaldehyde.

2. A process of production of the multifunctional hybrid particle fiber board from agro-residues as claimed in claim 1, wherein the process comprises the steps of:

a. dry and wet processing of an agrowaste to obtain fibres of a uniform length and removing moisture from agrowaste particulates and fibers;

b. homogeneous dry mixing of the agrowaste obtained in step (a) wherein (5-80%) of agrowaste particulates are mixed with a mineral waste (80%), a resin (8-10%) and a catalyst (0.5-5%) along with a pigment resin (0.2 to 0.5%) using a mechanical stirrer at 50-4000 rpm followed by compression moulding using a compression moulding machine to prepare a glossy finish hybrid particle fiber board;

c. casting the glossy finish hybrid particle fiber board at a temperature in a range of 25-75° C. at a pressure in a range of 2-95 kg/cm$^2$ followed by curing at 50-120° C. for a duration in a range of 2-24 hrs; and d. up scaling the glossy finish hybrid particle fiber board to dimensions of approximately 220 cm×120 cm with a varying thickness in a range of 6 mm to 50 mm to obtain the multifunctional hybrid particle fiber board.

3. The process as claimed in claim 2, wherein the agrowaste is selected from a group consisting of paddy straw, wheat straw, sisal fibre, jute fibre, banana fibre, flax, cotton, and hemp fibre, and processed fibres of the agrowaste have a size in a range of 5 μm-5 mm, a density in a range of 0.15-0.35 g/cc, a porosity of 55-85%; and the jute fabric has an elongation in a range of 2-15%, a tensile strength in a range of 250-800 MPa and a Young's modulus in a range of 5-10 GPa.

4. The process as claimed in claim 2, wherein the mineral waste is selected from the group consisting of marble waste, granite waste, stones waste, fly ash, red mud, lime sludge, gypsum rich waste, metallurgical waste, mining waste, chemical waste, fertiliser waste, glass fibre reinforced plastic waste, and silica fume, and wherein the mineral waste has a particle size below 200 μm, a density below 2.5 g/cc, a porosity in a range of 30-68% and a water holding capacity in a range of 2 to 110%.

5. The process as claimed in claim 2, wherein the resin is selected from the group consisting of epoxy resin and polyester, and polyurethane in a volume ratio ranging from 5-35%.

6. The process as claimed in claim 2, wherein the catalyst is selected from methyl ethyl ketone peroxide (MEKP), and aliphatic polyamine (Lapox K-6).

7. The process as claimed in claim 2, wherein the processed agrowaste particulates are mixed alone homogeneously with epoxy resin or a polyester at a volume ratio ranging from 5-70%, and reinforced to prepare unlaminated hybrid particle fiber board which is calendared with 5-15% of the jute fabric to prepare laminated hybrid particle fiber board.

* * * * *